Feb. 10, 1959  F. M. FRAGA  2,872,990
HITCH
Filed April 8, 1955  3 Sheets-Sheet 1
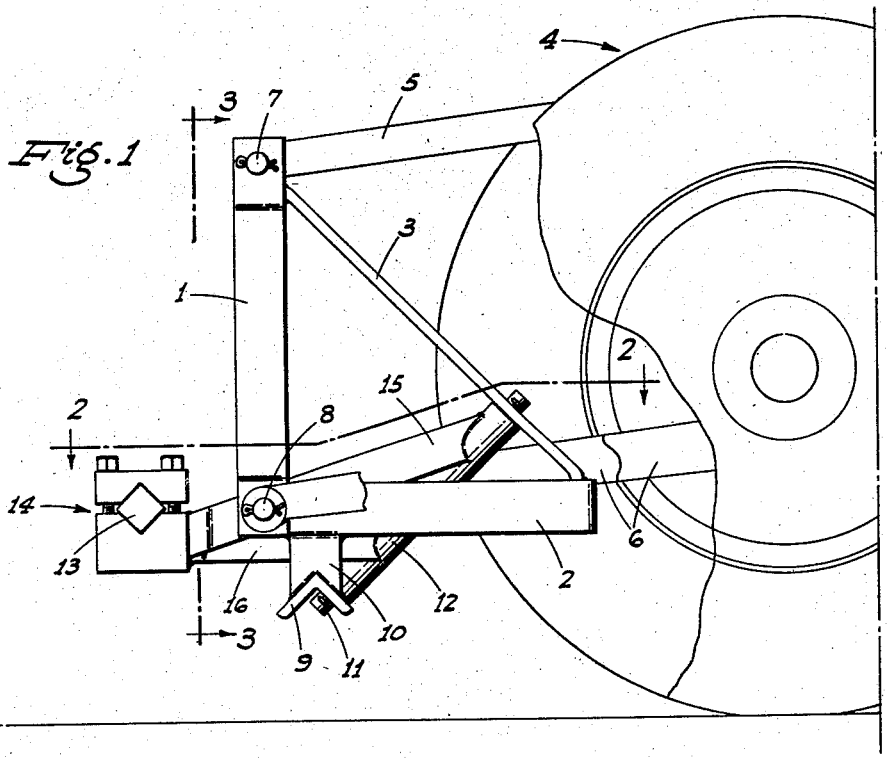
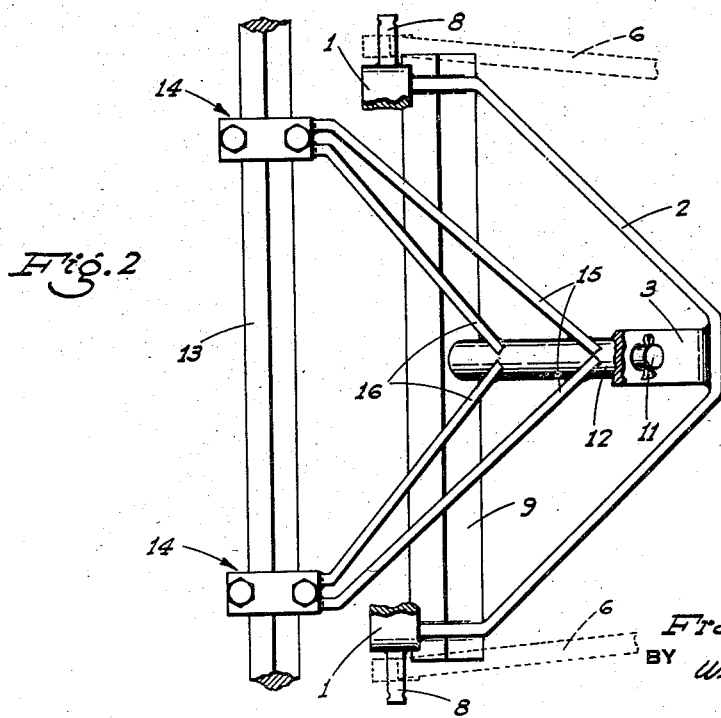
INVENTOR
Frank M. Fraga
BY Webster & Webster
ATTYS.

Feb. 10, 1959     F. M. FRAGA     2,872,990
HITCH
Filed April 8, 1955     3 Sheets-Sheet 2
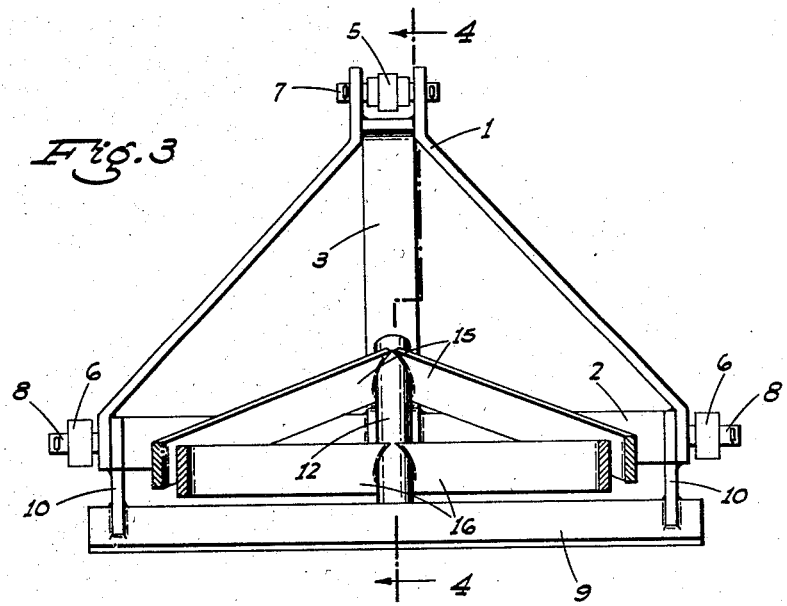
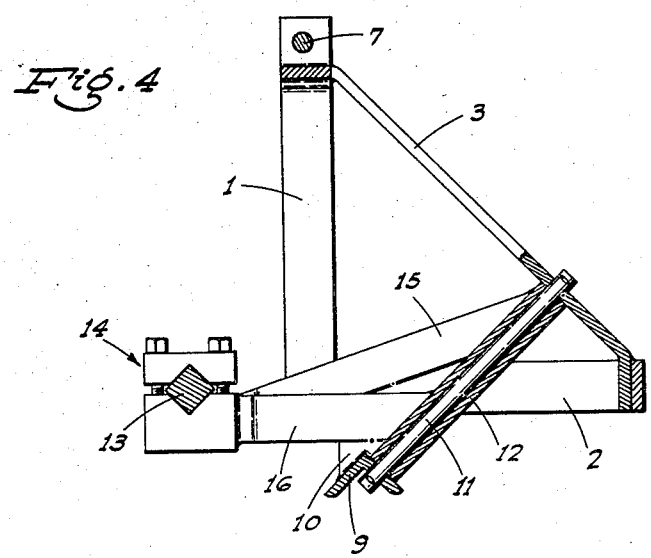
INVENTOR
*Frank M. Fraga*
BY *Webster & Webster*
ATTYS.

Feb. 10, 1959     F. M. FRAGA     2,872,990
HITCH
Filed April 8, 1955     3 Sheets-Sheet 3
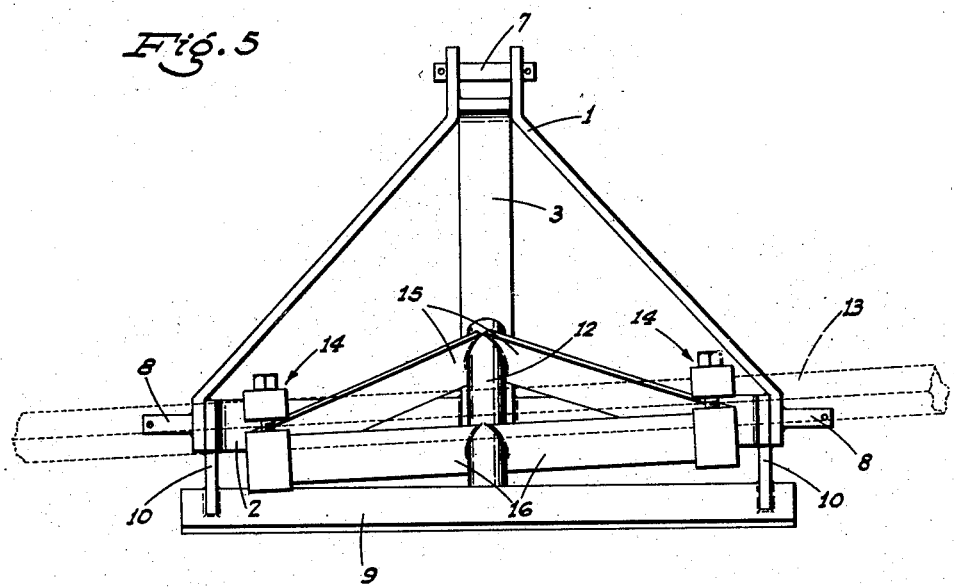
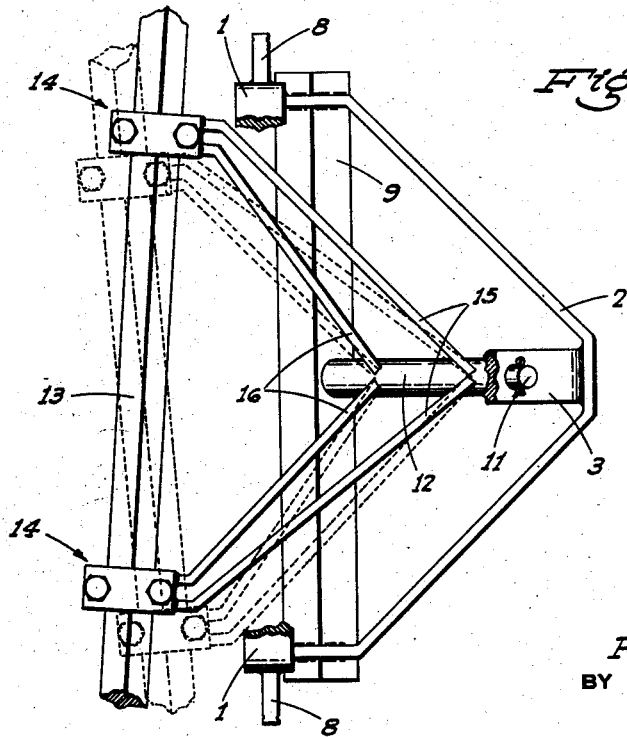
INVENTOR
Frank M. Fraga
BY Webster & Webster
ATTYS.

United States Patent Office 2,872,990
Patented Feb. 10, 1959

2,872,990

HITCH

Frank M. Fraga, Fresno, Calif.

Application April 8, 1955, Serial No. 500,116

3 Claims. (Cl. 172—449)

The present invention is directed to, and it is a major object to provide, an improved hitch for agricultural tools; the hitch being especially designed—but not limited—for tractor mounting. It is contemplated that the hitch can be mounted on a tractor, or on a wheel-supported tool carrier which is coupled to, and propelled by, a tractor; the function of the hitch being the same in either case.

Another important object of the invention is to provide a hitch which is adapted to mount a transverse row of earth working tools (or a single transversely extending tool of substantial length) in a novel floating and self-leveling manner.

An additional object of the invention is to provide a hitch, as in the preceding paragraph, wherein the transversely extending row of earth working tools are supported as a rigid unit and mounted for predetermined movement relative to the normally fixed frame which is included in the hitch. More specifically, the tools corresponding to one end portion of the tranverse tool unit automatically move upwardly and rearwardly when subjected to greater drag resistance from the ground than the tools corresponding to the other end portion of said unit; said latter tools—in response—moving forwardly and downwardly, and the entire transverse tool unit simultaneously shifting laterally in the direction of said other end portion thereof. These motions effectively compensate for such increased drag resistance, and side draft—which would otherwise be translated to the tractor (or tool carrier)—is reduced to a minimum. When the drag resistance subsequently equalizes along the entire transverse tool unit, the hitch of itself returns all the tools to the same running level or depth.

It is also an object of the invention to provide a hitch which is designed for ease and economy of manufacture, ready installation, and long service, with a minimum of maintenance or repair being required.

Still another object of the invention is to provide a practical, reliable, and durable hitch, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the hitch as tractor-mounted; the earth working tools being omitted from the tool bar.

Fig. 2 is a sectional plan view of the hitch taken on line 2—2 of Fig. 1.

Fig. 3 is a transverse vertical section taken on line 3—3 of Fig. 1.

Fig. 4 is a longitudinal vertical section taken on line 4—4 of Fig. 3, but with the spindle shown in full.

Fig. 5 is a rear elevation of the hitch showing the tool bar as moved upwardly and rearwardly at one end portion, and forwardly and downwardly at the other end portion, in response to increased drag resistance against the tools (not shown) carried by the tool bar on said one end portion.

Fig. 6 is a plan view of the hitch, partly broken away, showing the tool bar in full lines in the same position as in Fig. 5, and in dotted lines in a reversed drag resistance compensating position.

Referring now more particularly to the drawings, and to the characters of reference marked thereon, the hitch comprises an upstanding transverse A-frame 1, and a substantially horizontal A-frame 2 which is rigidly connected to, and projects forwardly from, the lower ends of the upstanding A-frame 1.

An upwardly and rearwardly inclined brace 3 is rigidly connected at its lower end centrally to the front of the forwardly projecting A-frame 2, and at the upper end to the corresponding end portion of said upstanding A-frame 1.

In the present embodiment the above described frame assembly is disposed rearwardly of a tractor; the latter being indicated generally at 4; such tractor including rearwardly projecting draft connections comprised of a central upper compression link 5 and transversely spaced lower lift links 6. The link 5 is coupled at its rear end to the upper end of the upstanding A-frame 1 by a cross pin 7, while the rear ends of the links 6 are pivotally connected to the lower ends of the upstanding A-frame 1 by trunnions 8 which project laterally outwardly therefrom.

With the frame assembly thus supported by the links 5 and 6, the hitch is maintained in longitudinally spaced relation to the tractor, but may be raised or lowered in response to actuation of the lift links 6 in the usual manner.

A cross bar 9 spans between opposite sides of the forwardly projecting A-frame 2 adjacent the rear thereof and below the same; such cross bar 9 being rigidly secured to said forwardly projecting A-frame 2 by attachment ears 10. The cross bar 9 is preferably an angle iron disposed so that one flange thereof parallels the brace 3.

A spindle 11, disposed lengthwise in the plane of the longitudinal line of draft, extends at a forward and upward incline from the parallel flange of the cross bar 9 to the brace 3; such spindle being suitably secured to said parts. The spindle, for best results, is preferably disposed at an angle of substantially 45 degrees to the ground or to the horizontal A-frame 2, as clearly shown in Figs. 1 and 4.

A sleeve 12 turnably surrounds the spindle 11 between the cross bar 9 and brace 3, extending full length between the same.

A normally level or horizontal, tool mounting bar 13 extends transversely a short distance rearwardly of the lower portion of the upstanding A-frame 1; such tool bar 13 being secured in transversely spaced clamps, indicated generally at 14.

A pair of upper, rearwardly and downwardly divergent arms 15 are fixed at their forward ends to a top portion of the sleeve 12, and at their rear ends to one element of the related clamps 14.

A pair of lower, rearwardly diverging arms 16—but which are substantially horizontal—are fixed at their forward ends to a lower portion of the sleeve 12 and at their rear ends to the same element of the related clamps 14. The arms 15 and 16, together with the clamps 14, thus secure the tool bar 13 to sleeve 12 for motion about spindle 11 as an axis.

When the described hitch is in use, the transverse row of tools which depend from the tool bar 13 into the ground normally run level; this by reason of equal drag resistance on all of such tools. However, should the tools corresponding to one end portion of the tool bar encounter a harder spot in the ground than the tools corresponding to the other end portion of said tool bar, the increased drag resistance from the ground will cause said one end portion of the tool bar, and the tools thereon, to automatically move upwardly and rearwardly, with responsive forward and downward movement of said other end portion of the tool bar, and the tools thereon. The above motions are accompanied by simultaneous transverse shifting movement of the tool bar, and all tools thereon, in the direction of said other portion of the tool bar. All of these movements are of course produced, in response to such drag resistance, by reason of the connection of the arms 15 and 16 to the sleeve 12, with the latter turnable about the forwardly and upwardly inclined spindle 11 as an axis.

See Fig. 5, for example, wherein, in full lines, the tool bar is shown raised at one end, lowered at the other end, and shifted slightly in the direction of the latter; all as occasioned by greater drag resistance being imposed on the tools on the portion of said tool bar related to said one end thereof. When the tool bar, and tools thereon, thus react there is effective compensation for such increased drag resistance, and which would otherwise result in undesirable side draft.

Upon an equalization of the drag resistance from the tools related to both end portions of the tool bar, the entire transversely extending tool unit—swinging about the spindle 11 as an axis—returns to its normal, level running position.

As the action of the transversely extending tool unit, in all its movements, is wholly automatic, the operator is not required to give any attention to the hitch once it is set so that the tools—when said unit is level—run to proper depth in the ground.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A hitch adapted to be secured to a tractor having transversely spaced, lower lift links, and a central upper compression link, all of said links projecting rearwardly from the tractor; said hitch comprising an upstanding frame, means connecting said links at their rear ends to corresponding points on the upstanding frame, another frame rigid with and projecting forwardly from the lower portion of said upstanding frame, a rigid diagonal brace between the front portion of said other frame and the top portion of the upstanding frame, said other frame having a cross bar secured thereto adjacent the rear, a turnable element journaled between the cross bar and brace for turning about an axis disposed at a forward and upward incline, a transverse normally level tool bar positioned rearwardly of the upstanding frame, and a rigid longitudinal arm structure connecting between said tool bar intermediate its ends and said turnable element.

2. A hitch adapted to be secured to a tractor having transversely spaced, lower lift links, and a central upper compression link, all of said links projecting rearwardly from the tractor; said hitch comprising an upstanding A-frame, means connecting said links at their rear ends to corresponding points on the upstanding A-frame, another A-frame rigid with and projecting forwardly from the lower portion of said upstanding A-frame, a rigid diagonal brace between the front portion of said other A-frame and the top portion of said upstanding A-frame, a cross bar rigidly secured to said other A-frame adjacent the rear thereof, a turnable element journaled between the cross bar and brace for turning about an axis disposed at a forward and upward incline, a transverse normally level tool bar positioned rearwardly of the upstanding A-frame, and a rigid longitudinal arm structure connected at its rear end to said tool bar, projecting forwardly through said upstanding A-frame, and connected at its forward end to said turnable element.

3. A hitch, as in claim 2, in which said turnable element is a sleeve; there being a spindle extending between the cross bar and brace, and said sleeve being journaled on the spindle.

References Cited in the file of this patent

UNITED STATES PATENTS

| | | |
|---|---|---|
| 910,752 | Warner | Jan. 26, 1909 |
| 1,735,568 | Gallagher | Nov. 12, 1929 |
| 2,060,066 | Goin | Nov. 10, 1936 |
| 2,320,141 | Kott | May 25, 1943 |
| 2,345,741 | Foulke | Apr. 4, 1944 |
| 2,417,595 | Heath | Mar. 18, 1947 |
| 2,618,211 | Fraga | Nov. 18, 1952 |

FOREIGN PATENTS

| | | |
|---|---|---|
| 885,320 | Germany | Aug. 3, 1953 |
| 67,716 | Norway | Apr. 11, 1944 |